United States Patent
Lazarus et al.

(10) Patent No.: US 6,748,050 B2
(45) Date of Patent: Jun. 8, 2004

(54) METHOD AND APPARATUS FOR PERFORMING EITHER TONE ANALYSIS ON A LOCAL LOOPED-BACK COMMUNICATIONS PATH OR UTILIZING A HYBRID REFLECTION BASED LOOPED-BACK TEST TO TEST INTEGRITY

(75) Inventors: David B. Lazarus, Elkins Park, PA (US); Jeffrey D. Ollis, Harleysville, PA (US); James D. Rosemary, Claymont, DE (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/862,268

(22) Filed: May 22, 2001

(65) Prior Publication Data

US 2002/0176542 A1 Nov. 28, 2002

(51) Int. Cl.[7] .................................................. H04M 1/24
(52) U.S. Cl. ........................ 379/3; 379/22.01; 379/22.02
(58) Field of Search ..................... 379/3, 22.01, 22.02, 379/27.03, 406.04, 406.06; 370/249, 286, 287; 714/716

(56) References Cited

U.S. PATENT DOCUMENTS

| | | | |
|---|---|---|---|
| 4,126,770 A | | 11/1978 | Sato et al. |
| 5,003,554 A | * | 3/1991 | Chism .................... 324/73.1 |
| 5,530,724 A | * | 6/1996 | Abrams et al. ............ 375/345 |
| 5,659,610 A | | 8/1997 | Schorr et al. |
| 5,881,129 A | * | 3/1999 | Chen et al. ............. 379/26.01 |
| 6,011,783 A | * | 1/2000 | Interrante et al. .......... 370/201 |
| 6,185,280 B1 | * | 2/2001 | Jarboe et al. .................. 379/3 |
| 6,349,130 B1 | * | 2/2002 | Posthuma et al. ......... 379/1.04 |
| 6,430,266 B2 | * | 8/2002 | Gershon ..................... 379/22 |

* cited by examiner

Primary Examiner—Curtis Kuntz
Assistant Examiner—Barry W Taylor
(74) Attorney, Agent, or Firm—Volpe and Koenig, P.C.

(57) ABSTRACT

In one embodiment, a test tone is placed in an outbound path of a full-duplex transmission system. An echo cancellation capability is disabled, enabling an echo signal of the test tone to pass through the inbound path of the full-duplex transmission system, which echo signal is analyzed to determine the condition of the full-duplex paths. In another embodiment a standard DSP generates DTMF tones which are looped-back and tested by the DSP, under control of a CPU. The DSP is a standard DSP avoiding the need for any hardware/software modification of the DSP to perform the test mode. The tests are performed the local level, i.e. at the subscriber's location, eliminating the need for central office intervention, for example.

12 Claims, 2 Drawing Sheets

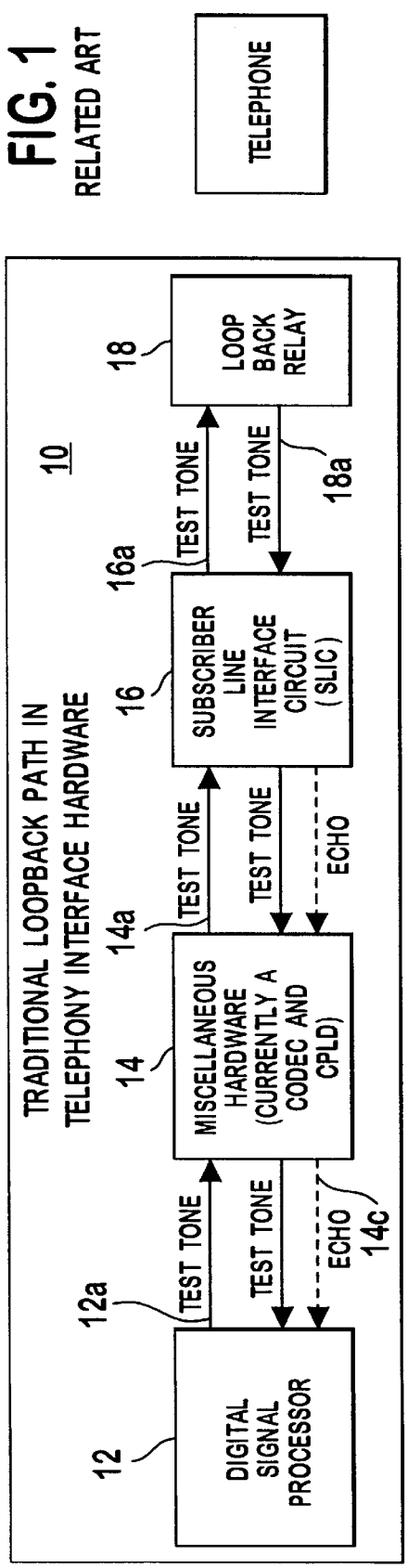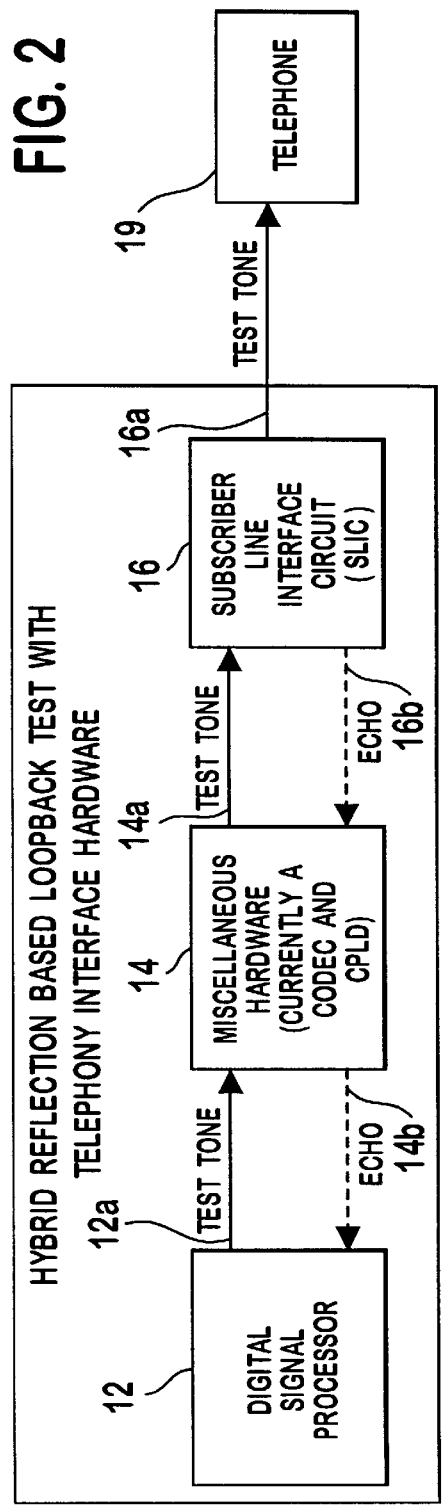

METHOD AND APPARATUS FOR PERFORMING EITHER TONE ANALYSIS ON A LOCAL LOOPED-BACK COMMUNICATIONS PATH OR UTILIZING A HYBRID REFLECTION BASED LOOPED-BACK TEST TO TEST INTEGRITY

BACKGROUND

The present invention relates to telephone service provided over hybrid fiber/cable broadband connections using Internet Protocol (IP) and more particularly to a simplified method and apparatus for testing the reliability of a residential gateway in one embodiment and for eliminating the need for traditional relay means in another embodiment.

Residential gateways must be low in cost and yet have high reliability. A key feature in providing reliability utilizes looped-back testing for purposes of remote testing and diagnostics. The traditional looped-back test design requires one relay per local line which adds costs and increases the likelihood of failures.

Looped-back testing is a standard method for testing full duplex paths within a telephony communication system. In order to perform looped-back testing, the normal path is modified at or near the system boundary to loop outbound messages back into the system on the inbound half of the full duplex path. The looped-back path is normally switched by either hardware or software.

The looped-back path is normally used only during a test mode. A looped-back test is performed by first enabling the looped-back path where upon a signal is placed on the outbound path. If that signal is detected on the inbound path the test verifies the integrity of the path.

FIG. 1 shows a system employing a conventional testing approach.

Making reference to FIG. 1, a portion 10 of a telephone network comprises a Digital Signal Processor (DSP) 12, which generates a test tone in the form of PCM (Pulse Code Modulation) data at 12a and applies it to circuitry 14 incorporating a CODEC (encoder/decoder) and a CPLD (Complex Programmable Logic Device—is a logic chip that can be programmed to perform any specific logic function and is similar to a PGS, FPGA or a PLD). The test tone at 12a is converted into an analog signal, appearing at 14a and applied to an SLIC (subscriber line interface circuit) 16 which may alternatively be a hybrid circuit including any SLIC part. The test tone is looped-back to the SLIC 16 through a normally open looped-back relay 18 which is closed preparatory to receipt of the test tone appearing at 16a through suitable hardware or software (not shown for purposes of simplicity).

The looped-back test tone, appearing at 18a, is applied through subscriber line interface circuit (SLIC) 16 to circuit 14 which converts the analog signal into digital form, this digital output being applied to the DSP 12 through 14c. DSP 12 receives both the test tone from the looped-back path as well as the echo of the looped-back message, represented by dotted line 14c.

It is advantageous to determine the integrity of a subscriber line without the need for a looped-back relay which requires hardware and software to operate the looped-back relay and which further complicates the test in the event of faulty operation of the looped-back relay.

SUMMARY

It is therefore one object of the present invention to provide novel method and apparatus for determining the integrity of a full duplex path subscriber line while eliminating the need for a looped-back relay and all of the attendant hardware/software required for its appropriate operation.

Still another object of the present invention is to provide for loop-backed testing of a full-duplex transmission path employing conventional apparatus for generating DTMF tones for test purposes, which apparatus avoids the need for additional software or other modifications.

Still another object of the present invention is to locally test the integrity of a subscriber's full-duplex transmission path and thereby avoid the need for intervention by a central office, for example.

The present invention, in one preferred embodiment thereof, utilizes appropriate hardware and software for generating a test tone applied as an outbound message in the full duplex path having a Hybrid Reflection Based Loopback. An echo cancellation circuit, which normally removes a reflection that is typically present in this type of circuit is the means by which the echo is removed. However, upon initiation of a test mode, the echo cancellation capability is disabled and the echo is used as the test signal, providing a simplified and yet effective detection of the return path test tone at the Digital Signal Processor (DSP) 12, thereby increasing reliability while decreasing cost through the elimination of the looped-back relay and its control means, as well as simplifying the detection of the return path test tone at the DSP 12.

An still another embodiment of the present invention, a BTI generates one or more DTMF tones that are processed through the normal circuitry of the BTI for providing audio signals to the attached phone(s) but, rather than applying the signal to a phone, the signal is looped back and processed by the circuitry that receives the audio signals from the phone. Software that is conventionally resident in DSP to detect the DTMF tones is used to analyze the quality of the received signals.

Although the DSP is an ideal place for checking quality of looped back audio, it is preferable to use existing DSP software to perform the desired test and thereby avoid the need for additional hardware/software to perform the test, thus avoiding the need to modify such existing equipment/software.

SGCP is a centralized signal protocol requiring that the Call Agent (i.e., the central call signaling authority) know the call state of each endpoint device in the system. In existing telephone networks, loopback analysis is performed by a piece of equipment that is shared across a wide population of equipment and there are no known solutions that provide local signal analysis. The alternative embodiment makes advantageous use of DTMF generation/detection software in the generation/analysis of a looped back test signal.

A central processing unit (CPU) places the hardware into the looped-back mode and sends a command the DSP to generate DTMF tones which are generated as digital signals. The digital signals are converted into analog form by the CODEC and transferred to the SLIC (Subscriber Line Interface Circuit). The signal is looped back through the SLIC, converted to digital form by the CODEC and processed by the DSP, which processes the test tones in the normal manner, reporting the results to the CPU, which then determines the integrity of the signal path. This technique utilizes the DTMF tones and loops back the signal through the SLIC, eliminating the need for reconfiguration or modification of the DSP and/or its attendant hardware/software.

BRIEF DESCRIPTION OF THE DRAWING(S)

The above as well as other objects of the present invention will become apparent when reading the accompanying description and drawings, in which:

FIG. 1 is a simplified block diagram useful in explaining the conventional technique for testing a subscriber line through the use of a looped-back relay.

FIG. 2 is a block diagram useful in describing one preferred embodiment of the present invention.

DETAILED DESCRIPTION OF THE PREFERRED EMBODIMENTS

Making reference to FIG. 2, wherein like elements employed in FIGS. 1 and 2 are designated by like numerals, DSP 12 generates a digital test tone at 12a and applies it to CODEC circuit 14. The test tone, converted to analog form, is applied through 14a to the SLIC 16. The SLIC is the interface between the 2-wire line within the house and the 4-wire line output of the Codec 14. There is typically an impedance mismatch between the 2-wire and the 4-wire segments of the line. Any signal crossing the interface will also be reflected backwards. When delayed by a significant time, it is heard as an echo. The test tone, in addition to being transferred to local telephone 19 through line 16a, causes an echo to appear in the return line resulting from the hybrid reflection based loopback. The loopback test can be performed on a line with no attached phones and it is not necessary that a local phone be provided to perform the test. The echo, appearing a 16b, is applied to circuit 14 where it is converted into digital form and applied, at 14b, to Digital Signal Processor (DSP) 12. The echo cancellation function is performed by the DSP. There is an API interface to control echo cancellation function. The CPU uses the API to turn off the echo cancellation. The echo signal, however, which is not cancelled, is utilized as a test signal and its presence is indicative of a satisfactory operating full duplex path.

Figure 2A:
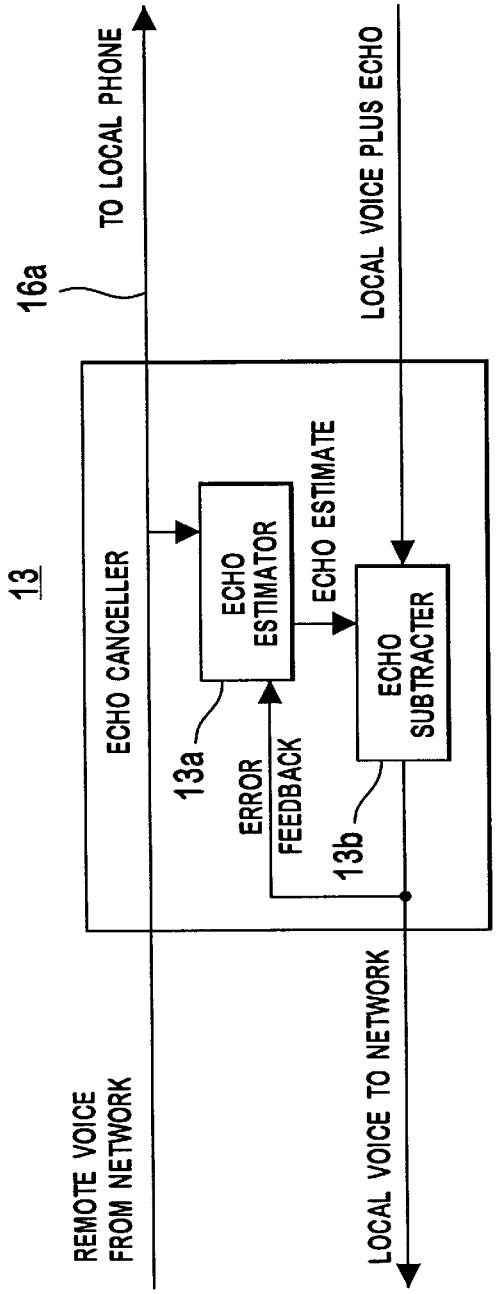
FIG. 2a is a simplified block diagram shown of an echo cancelling function.

FIG. 2a shows a functional diagram of echo canceller 13. The echo canceller 13, which is conventional, forms part of the DSP 12 (see FIG. 2) and applies the source of the echo to an echo estimator function. The echo estimator function 13a generates an estimate of the echo for the echo subtracter. The echo subtracter 13b removes the echo from the in-bound signal by subtracting the echo estimate. The output of the echo subtracter is used to fine tune the echo estimator 13a during periods where there is no local signal except for echo. During all loopback testing, the echo cancellation function must be turned off or disabled because, the echo cancellation function will treat the loopback tones as echo and subtract it out. The CPU 32 uses the API to turn off the echo canceller, enabling the echo to be employed as the test signal. The receipt and detection of an echo signal assures the integrity of the residential gateway.

Figure 3:
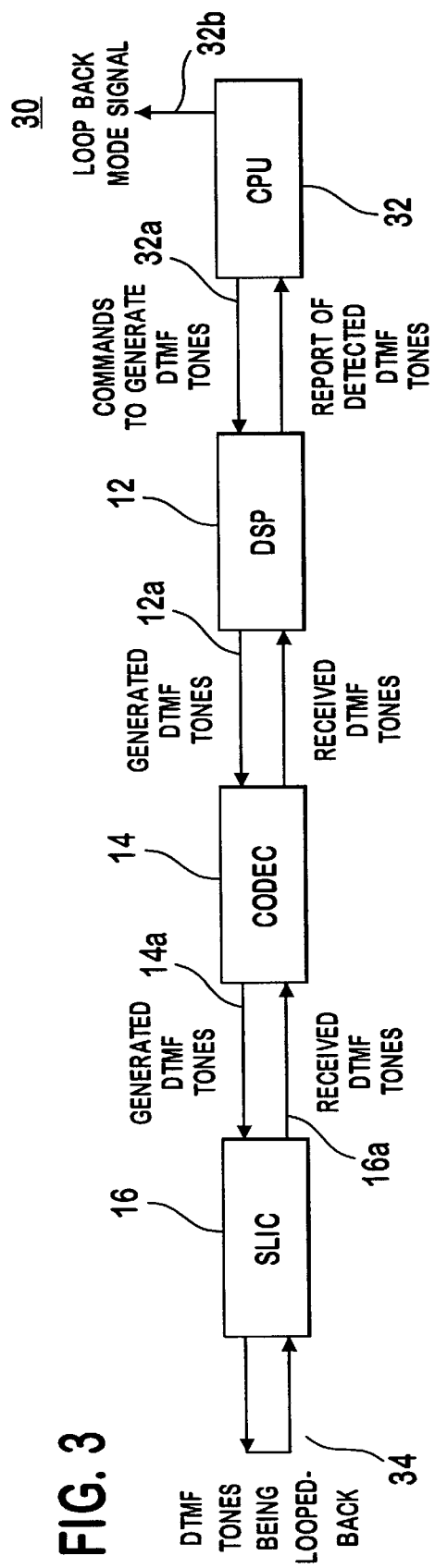
FIG. 3 is a block diagram useful in describing another preferred embodiment of the present invention.

FIG. 3 shows still another embodiment 30 of the present invention in which CPU 32 generates a command at 32a causing the DSP 12 to generate DTMF tones. Just prior to this command, CPU 32 provides a control at 32a to place the hardware in the looped-back mode, providing a loopback circuit as shown as 34, using a relay-based loopback of the type shown, for example, in FIG. 1. The loopback test is initiated by SNMP. DSP 12, after receiving the command signal, generates DTMF tones and applies these tones at 12a to CODEC 14, which digital tones which are converted into analog form and sent to the SLIC 16. The DTMF tone generated by the DSP is, in one preferred embodiment, composed of a 941 Hz tone and a 1209 Hz tone, both tones being provided at a power level of −14 dBm for a period preferably of the order of 100 milliseconds. The echo based test in the embodiment of FIG. 2 may use similar tones at a different volume level depending on the strength of the echo. It is possible that a customer might press a key on the telephone keyboard that matches the DTMF tones used for the test, and that tone could reach the SLIC, resulting in the tone being detected even though the SLIC is faulty. However, this is highly unlikely. In order to significantly reduce the likelihood of operation of a key by the customer which produces the test tone, a multiple tones sequence may be employed. The DTMF tones looped-back through SLIC 16, are applied at 16a to CODEC 14 where they are converted into digital format and applied to DSP 12.

DSP 12 detects and processes DTMF tones in the conventional manner (requiring no additional hardware/software to accomplish this), reporting the results to the CPU 32. This technique permits utilization of the conventional software capabilities of the DSP as the means for testing the subscriber circuit, further avoiding the need for providing the DSP with any additional hardware/software, thereby avoiding the need to convert or modify conventional equipment as well as equipment already in place in the field in order to perform local testing of the full-duplex transmission path.

It should be noted that the above tests are performed when the local phones are on hook. If any phone goes off hook the test is stopped.

What is claimed is:

1. A method for locally testing a full-duplex transmission path of a subscriber residential gateway in an IP network telecommunication system having outbound and inbound paths and having an echo cancelling capability, the method comprising:
    a) generating a test tone by a digital signal processor;
    b) placing the test tone on the outbound path to the subscriber's location;
    c) disabling said echo cancellation by said processor using an API;
    d) detecting for presence of an echo of the test tone in the inbound path; and
    e) determining integrity of the residential gateway based on the detected echo signal.

2. The method of claim 1 wherein step (a) further comprises generating a test tone in digital format; and
    converting the test tone into analog form for placement on the outbound path.

3. The method of claim 1 further comprising:
    a) generating a status signal to indicate a condition of the full duplex transmission path responsive to the integrity determined at step (e).

4. The method of claim 3 further comprising transmitting a signal representing the condition of the full duplex transmission path to a remote location.

5. The method of claim 1 wherein the test tone of step (a) is a DTMF tone.

6. The method of claim 5 wherein step (a) further comprises generating digital DTMF tones; and converting the digital DTMF tones into analog form for placement on the outbound path; and
    step (d) further comprises converting the detected test signal echo into digital form for analysis by the processor.

7. The method of claim 1 further comprising preventing generation of a test tone when the subscriber's telephone is off-hook and terminating the test if at least one subscriber telephone goes off-hook during the test.

8. A residential gateway in a telephony network of the IP or ATM type, comprising:
- a processor generating a test tone;
- an SLIC having hybrid linked outbound and inbound paths;
- said outbound path receiving the generated test tone;
- said test tone in the outbound path causing an echo signal to be developed in the SLIC inbound path;
- said inbound path being coupled to said processor;
- a circuit for canceling an echo received in the inbound path;
- said processor disabling the echo canceling circuit when generating the test tone, enabling the processor to determine integrity of the residential gateway by the detecting an echo signal when the output end of the outbound path and the input end of the inbound path are in an open-loop condition.

9. The telephony network of claim 8 wherein the processor generates digital DTMF tones;
- a convertor for converting digital DTMF tones into analog form for transmission through the SLIC outbound path; and
- a convertor for converting the echo signal at an output end of the inbound path into digital form for analysis by said processor.

10. The telephony network of claim 9 wherein said processor is a digital signal processor (DSP).

11. The telephony network of claim 9 wherein the processor enables the echo cancelling capability upon completion of analysis of the looped-back signal.

12. The telephony network of claim 8 wherein the processor disables the echo cancelling circuit at least prior to receipt of the echo signal in said inbound path.

* * * * *